United States Patent
Stolte et al.

(10) Patent No.: US 8,857,767 B2
(45) Date of Patent: Oct. 14, 2014

(54) DE-ICING SYSTEM FOR AN AIRCRAFT

(75) Inventors: Ralf-Henning Stolte, Hamburg (DE); Uwe Wollrab, Soltau (DE)

(73) Assignee: Airbus Operations GmbH (DE)

(*) Notice: Subject to any disclaimer, the term of this patent is extended or adjusted under 35 U.S.C. 154(b) by 286 days.

(21) Appl. No.: 12/988,142

(22) PCT Filed: Apr. 15, 2009

(86) PCT No.: PCT/EP2009/054451
§ 371 (c)(1),
(2), (4) Date: Oct. 15, 2010

(87) PCT Pub. No.: WO2009/127652
PCT Pub. Date: Oct. 22, 2009

(65) Prior Publication Data
US 2011/0031353 A1  Feb. 10, 2011

Related U.S. Application Data

(60) Provisional application No. 61/124,379, filed on Apr. 16, 2008.

(30) Foreign Application Priority Data

Apr. 16, 2008 (DE) .......................... 10 2008 019 146

(51) Int. Cl.
| | | |
|---|---|---|
| B64D 15/02 | (2006.01) | |
| B64D 15/04 | (2006.01) | |
| B64C 21/04 | (2006.01) | |
| B64D 13/06 | (2006.01) | |
| B64D 41/00 | (2006.01) | |

(52) U.S. Cl.
CPC .............. *B64C 21/04* (2013.01); *Y02T 50/166* (2013.01); *B64D 2013/0614* (2013.01); *B64D 15/04* (2013.01); *Y02T 50/56* (2013.01); *B64D 2041/005* (2013.01); *B64D 2013/0622* (2013.01); *Y02T 90/36* (2013.01); *B64D 2013/0607* (2013.01)
USPC ...................................................... 244/134 B

(58) Field of Classification Search
USPC ................................. 244/134 B, 134 R, 134 D
See application file for complete search history.

(56) References Cited

U.S. PATENT DOCUMENTS

| 2,777,301 A | 1/1957 | Kuhn |
|---|---|---|
| 3,058,695 A | 10/1962 | Simonis |

(Continued)

FOREIGN PATENT DOCUMENTS

| CN | 1950253 A | 4/2007 |
|---|---|---|
| DE | 1261404 B | 2/1968 |

(Continued)

*Primary Examiner* — Valentina Xavier
(74) *Attorney, Agent, or Firm* — Lerner, David, Littenberg, Krumholz & Mentlik, LLP

(57) ABSTRACT

The invention pertains to a de-icing system for an aircraft with at least one heat source and at least one air delivery means for delivering air into regions of the aircraft to be de-iced. In comparison with the prior art, the invention is characterized in that the air delivery means is connected to an air-conditioning system of the aircraft for discharging air from the cabin of the aircraft via an air heating device, wherein the air heating device is connected to at least one heat source in order to heat the air from the cabin of the aircraft. The de-icing system according to the invention is able to realize a wing de-icing that not only fulfills an anti-icing function, but also a de-icing function on the ground without additional expenditure of energy. The function of the de-icing system according to the invention could also be advantageously supplemented by utilizing the cabin waste air for increasing the flow energy on the upper side of the wing in order to delay a change-over or separation of the boundary layer and to generally increase the lift or lower the resistance.

9 Claims, 2 Drawing Sheets

(56) References Cited

U.S. PATENT DOCUMENTS

Figure 1A:
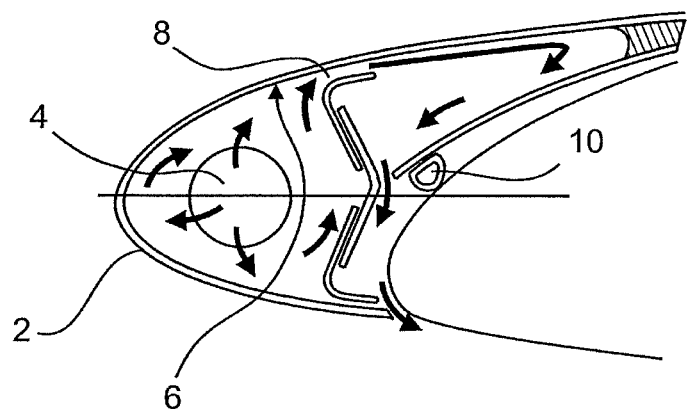

| | | | |
|---|---|---|---|
| 3,083,546 A * | 4/1963 | Turck | 62/150 |
| 4,482,114 A * | 11/1984 | Gupta et al. | 244/134 B |
| 6,131,855 A * | 10/2000 | Porte | 244/134 B |
| 6,370,450 B1 * | 4/2002 | Kromer et al. | 701/14 |
| 6,698,691 B2 * | 3/2004 | Porte | 244/134 B |
| 7,175,136 B2 * | 2/2007 | Shah et al. | 244/134 R |
| 2005/0178923 A1 * | 8/2005 | Saiz | 244/207 |
| 2006/0097111 A1 * | 5/2006 | Wood et al. | 244/134 C |
| 2008/0001026 A1 * | 1/2008 | Hoffjann et al. | 244/58 |
| 2009/0008505 A1 | 1/2009 | Meister | |
| 2009/0065646 A1 * | 3/2009 | Hale et al. | 244/136 |
| 2011/0011981 A1 * | 1/2011 | Vauchel et al. | 244/134 B |

FOREIGN PATENT DOCUMENTS

| | | |
|---|---|---|
| DE | 102006002882 A1 | 8/2007 |
| EP | 0888966 A2 | 1/1999 |
| EP | 2076437 A1 | 7/2009 |
| WO | 2006/058774 A2 | 6/2006 |

* cited by examiner

Prior Art

DE-ICING SYSTEM FOR AN AIRCRAFT

CROSS-REFERENCE TO RELATED APPLICATIONS

This application is a national phase entry under 35 U.S.C. §371 of International Application No. PCT/EP2009/054451, filed Apr. 15, 2009, published in German, which claims the benefit of the filing date of U.S. Provisional Patent Application No. 61/124,379, filed Apr. 16, 2008, and German Patent Application No. 10 2008 019 146.9, filed Apr. 16, 2008, the entire disclosures of which applications are hereby incorporated herein by reference.

FIELD OF THE INVENTION

The invention pertains to a de-icing system for an aircraft with at least one air delivery means and a heat source.

TECHNOLOGICAL BACKGROUND OF THE INVENTION

Aircraft, in particular larger passenger aircraft, need to be de-iced during certain flight phases and on the ground for a number of reasons. The freezing or freeze-related seizing of flaps and other movable parts, as well as the formation of ice on the wing profile, significantly deteriorates the aerodynamic properties and increases the weight of the respective aircraft such that the in-flight formation of ice needs to be prevented and ice that has already formed on an aircraft situated on the ground needs to be removed. These two processes are usually referred to as "de-icing" (ice removal) and "anti-icing" (prevention of ice formation). Although the following description concerns, in particular, anti-icing, the invention is by no means restricted to anti-icing.

Different variations of anti-icing systems have prevailed in the prior art. For example, bleed air withdrawn from the engines is routed into the interior of leading wing edges via a perforated pipeline in order to heat the leading wing edge and prevent freezing of condensation water droplets. Other systems heat the leading wing edges or other critical areas by means of electrically operated heaters. In this case, temperature limits need to be observed in order to protect the materials used. This is particularly critical during ground use because the electrically heated surfaces are not simultaneously cooled by the relative wind. One particular disadvantage of previously known de-icing methods is the fact that the engines need to make available bleed air and/or an electric current for the de-icing system. The withdrawal of bleed air lowers the efficiency of the aircraft because additional air is taken in from the surroundings and compressed such that the fuel consumption increases. The withdrawal of a relatively large quantity of electrical energy from the generators of the engines increases their shaft output to be generated such that the fuel consumption is also increased in this case.

SUMMARY OF THE INVENTION

It is therefore the object of the invention to propose a de-icing system that, if possible, does not require the withdrawal of additional bleed air and, if possible, also makes it possible to realize a reliable de-icing process without larger quantities of electrical energy.

This object is met by a de-icing system for an aircraft with the features of independent claim 1. Advantageous embodiments are disclosed in the dependent claims.

In the de-icing system according to the invention, exhaust air from an aircraft cabin is heated by means of a heat source and routed to the regions of the aircraft to be de-iced. The heat flow occurring during the discharge of the heated air at the vulnerable regions effectively prevents ice accumulation. The heat sources used do not consist of additional devices, but essentially of systems that already produce waste heat that would otherwise have to be released into the surroundings by means of cooling systems. A fuel cell provided in a modern aircraft which generates an electric current and continuously releases heat during this process could serve as one of many conceivable examples. The temperatures of such a fuel cell do not reach the limiting temperatures of the materials used for the surfaces to be de-iced. The wings could also contribute to the condensation of the water from the fuel cell in the form of a heat sink.

In order to transport this waste heat to the areas of the aircraft to be de-iced, cabin exhaust air that is heated by the waste heat can be used as heat transfer medium. In this case, it is advantageous that the system producing the waste heat—e.g., the fuel cell—is also simultaneously cooled. In addition to a fuel cell, it would also be conceivable to utilize a number of other systems that produce a sufficient quantity of waste heat. This also includes, in particular, processors, computers and control devices (collectively referred to as "avionic devices") that are usually accommodated in racks at one location within the aircraft and generate a concentrated flow of waste heat. Another advantage of utilizing the cabin air can be seen in that it is possible to continue to use the pressure of the cabin. The pressure energy is nowadays delivered outboard via the outflow valve, wherein at least a portion thereof is converted into thrust. Additional blowers or compressors may be optionally used for the inventive de-icing system.

It is therefore particularly advantageous that the inventive de-icing system neither requires an additional withdrawal of bleed air from the engines nor large quantities of electrical energy for the de-icing process. Consequently, the engines can be operated more efficiently and with a lower fuel consumption than in the prior art. Another advantage can be seen, in particular, in that the different systems that produce waste heat are automatically cooled during the de-icing process such that a conventionally provided cooling system can have correspondingly smaller dimensions and the fuel consumption and the weight of the aircraft can be additionally reduced.

Another advantage of the inventive de-icing system is, for example, that the time-consuming and costly de-icing procedures on the ground can be eliminated or significantly reduced such that the cost-effectiveness for the respective airline, as well as the punctuality of the aircraft, is improved and the impact on the environment is reduced due to the smaller quantities of de-icing fluid used. The reason for this can be seen in that the nowadays used internal de-icing can only be used in-flight because the engine bleed air flows through the wing with a temperature of approximately 200° C. and would cause the permissible temperature of the wing structure to be exceeded without the cooling influence of cold air from the surroundings. The solution proposed with the inventive de-icing system preferably operates with lower temperatures and therefore also does not lead to critical temperatures on the ground such that this system can, in principle, also be used on the ground. Another advantage can be seen in that the wind resistance can also be reduced and the lift can be increased while cruising and/or during takeoffs and landings. This can be achieved due to the fact that a resistance-reducing and/or a lift-increasing influence on the boundary layer can be achieved with a suitable permanent flow of waste air through the wing.

In another advantageous additional development of the inventive de-icing system, at least a majority of the accumulating cabin waste air is heated by means of waste heat and routed into the wing in order to be used for de-icing purposes at this location and ultimately discharged from the aircraft via the outflow valves at the respective end region of the wing. In this case, the outflow valves are preferably arranged in such a way that a propulsive force can be generated with the outflowing cabin waste air.

This in turn makes it possible to reduce the number of cabin air outflow valves at least in certain regions on the underside of the fuselage.

SHORT DESCRIPTION OF THE DRAWINGS

Figure 1B:
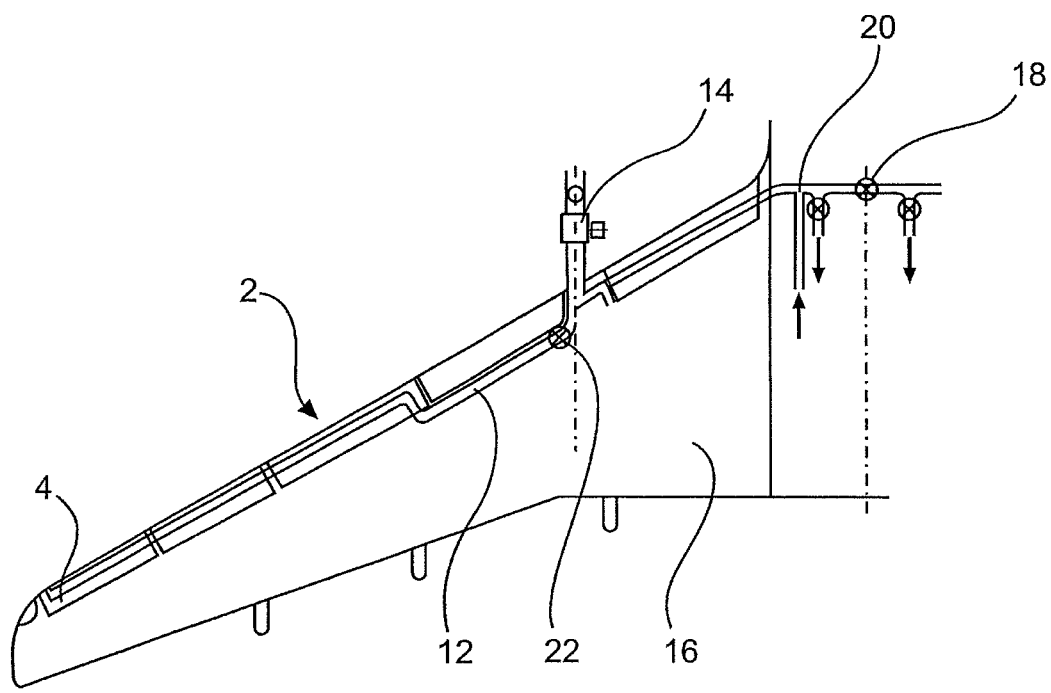

The invention is elucidated in greater detail below with reference to the figures. Identical objects are identified by the same reference symbols in the figures. These figures show:

FIGS. 1a-b: a de-icing system according to the prior art; and

Figure 2:
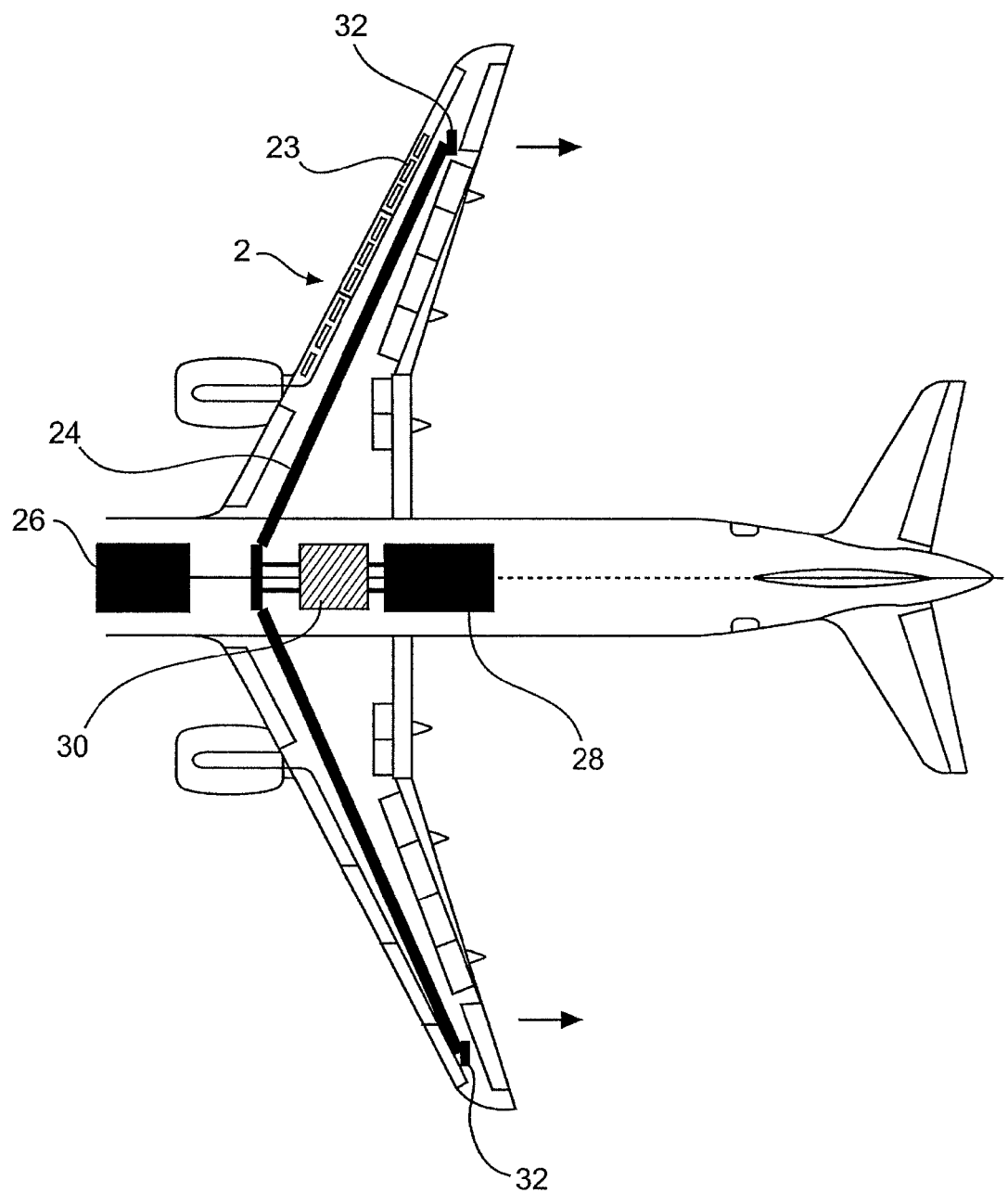

FIG. 2: a schematic representation of the de-icing system according to the invention.

DETAILED DESCRIPTION OF AN EXEMPLARY EMBODIMENT

FIG. 1a schematically shows a widely used system for de-icing in aircraft wing according to the prior art. A perforated pipeline 4 (also referred to as "Piccolo tube") is situated in a leading wing edge 2, wherein warm air is discharged from said pipeline toward the inner side 6 of the leading wing edge 2 in order to prevent an ice accumulation thereon due to the input of heat. In the example shown in FIG. 1a, the leading wing edge 2 consists of the leading edge of a leading wing edge flap (also referred to as "slat"). Within this leading wing edge flap, the warm air discharged toward the leading edge 2 can also flow into regions that are situated further toward the rear referred to the direction of flight and further toward the upper side of the wing and thusly keep mating seals 10 free of ice. If the warm air is discharged tangentially, the outflow is preferably realized behind the separation layer.

FIG. 1b elucidates the correlation between the perforated pipelines 4 and an air source as it is used in the prior art. Several perforated pipelines 4 situated along the leading wing edge 2 are connected to a pipeline system 12 that, in turn, is connected to at least one engine in order to withdraw bleed air. In this case, it is preferred to respectively provide one bleed air withdrawal point 14 for each engine that are respectively positioned on both wings 16 of the aircraft and deliver their air into the pipeline system 12 separately or jointly via a so-called "cross bleed valve" 18. It would furthermore be possible to route air from an auxiliary engine into the pipeline system 12 via a feed point 20. Each wing 16 also contains a valve 22 that is able to open, close and regulate the flow of de-icing air.

The de-icing system according to the prior art illustrated in FIGS. 1a and 1b is only used in the ice-susceptible flight phases, i.e., particularly during takeoff and landing phases, due to the economically disadvantageous withdrawal of bleed air from the engines. The de-icing system largely remains switched off while cruising and while the aircraft is situated on the ground. Since the bleed air withdrawn from the engines reaches a relatively high temperature, it is also not sensible to utilize the de-icing system on the ground because the aircraft is—in comparison with normal cruising—situated in a relatively warm environment and de-icing with a high temperature could easily exceed the permissible temperature limiting value for the structure being de-iced. While the aircraft is in-flight, however, the cool ambient air flowing around the wing cools the structure to be de-iced in such a way that even the influence of de-icing air with high temperatures would not cause the permissible temperature of the structure to be exceeded.

The de-icing system according to the invention illustrated in greater detail in FIG. 2 solves this problem. Several air delivery means 23 are arranged in the wings 16 and realized, for example, in the form of perforated air pipes ("Piccolo tubes") analogous to the prior art in order to deliver heated air, in particular, into the leading wing edges 2. The waste air withdrawn from the cabin in order to maintain a constant air quality is made available by an air-conditioning system 26 and additionally heated by a downstream heat source 28. This heating is achieved with an air heating device 30 that, for example, could be realized in the form of a heat exchanger, wherein cabin waste air from the air-conditioning system 26 flows through one branch of said heat exchanger and, for example, the waste air of a heat source 28 in the form of a heat-generating system flows through another branch of the heat exchanger. The heat source 28 could, for example, be realized in the form of a fuel cell that could be integrated on board the aircraft anyway in order to fulfill the function of an auxiliary engine or for generating part of the electrical energy in-flight. During the withdrawal of the waste heat from the fuel cell, the fuel cell is simultaneously cooled due to the heat transfer into the cooler waste air from the air-conditioning system 26. This means that the necessity of cooling a heat-releasing system and the required heat input of the de-icing air can be jointly and synergistically combined in order to increase the overall efficiency of the aircraft.

In addition to fuel cells, it would also be possible to utilize other systems that make available a sufficient quantity of waste heat as heat sources 28. The systems may consist, for example, of avionic devices that are arranged in a concentrated fashion in racks, for example, underneath the cockpit of the aircraft or at another suitable location and fulfill a number of data-processing tasks. The avionic devices usually generate significant waste heat such that it is possible to cool the avionic devices with the cabin waste air and to simultaneously heat the cabin waste air in order to de-ice the aircraft. It would also be possible to utilize the waste heat of avionic devices, fuel cells and/or other heat-generating systems in a combined fashion for de-icing purposes.

The temperature level of the de-icing system according to the invention is substantially lower than that of a standard pneumatic de-icing system according to the prior art, for example, because it is possible to utilize fuel cells in the form of low-temperature fuel cells that reach waste heat temperatures of, for example, 80° C. With respect to avionic devices that require cooling, temperatures of approximately 50 to 80° C. can be reached. This temperature level suffices for de-icing the aircraft if a correspondingly large volumetric air flow rate can be used for de-icing purposes. Since the cabins of larger passenger aircraft are supplied with a relatively large quantity of air—for example, several liters of fresh air are introduced per passenger and second and the same quantity is discharged from the cabin—it is assumed that sufficient air for utilizing system waste heat of relatively low temperature for de-icing purposes is available when the de-icing system according to the invention is used in a modern passenger aircraft.

The invention is not limited to the withdrawal of waste heat from fuel cells and avionic devices, but rather also makes it possible to consider any continuously operating device that produces sufficient heat for heating the cabin waste air.

In the de-icing process according to the invention, air is preferably continuously delivered in the direction of the leading wing edge 2. Since this delivery of air does not require additional energy of the engines and, in a manner of speaking, sensibly utilizes the energy losses of various installed systems that occur anyway in a parasitic fashion, the air discharged on the leading wing edges 2 can also be utilized for permanently increasing the lift and for shifting the change-over point of the laminar boundary layer on the upper side of the wing by purposefully discharging air on the upper side of the wing. This can be realized with other lines that are not illustrated in the figures and purposefully introduce air into the flow around the wings through microscopic holes in a particularly suitable region of the upper side of the wing such that their energy is increased, particularly during takeoffs and landings and while cruising. This makes it possible to realize smaller angles of attack of the wings 16 and/or more favorable profiles such that a lower resistance and therefore a lower fuel consumption can be achieved.

If it is necessary to utilize a large quantity of air for carrying out a de-icing process at a low temperature level, it would also be conceivable to introduce all or at least a majority of the accumulating cabin waste air into the wing 16 and to distribute this air over the air delivery means 23 and outflow valves 32 by means of not-shown valve arrangements. In this case, the outflow valves 32 (also referred to as "outflow valves") needs to be positioned in such a way that the discharged cabin waste air exerts a propulsive effect upon the aircraft. This is the case, for example, if the outflow vector extends opposite to the direction of flight with a more or less pronounced vertical component directed toward the ground.

All in all, the de-icing system according to the invention is able to realize a wing de-icing that not only fulfills an anti-icing function, but also a de-icing function on the ground without additional expenditure of energy. The function of the inventive de-icing could also be advantageously supplemented by utilizing the cabin waste air for increasing the flow energy on the upper side of the wing in order to delay a change-over or separation of the boundary layer and to generally increase the lift or lower the resistance.

As a supplement, it should be noted that "comprising" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

LIST OF REFERENCE SYMBOLS

2 Leading wing edge
4 Perforated pipe (Piccolo tube)
6 Inner side of leading wing edge
8 Gaps
10 Mating seals
12 Pipeline system
14 Bleed air feed point
16 Wing
18 Cross bleed valve
20 APU air feed point
22 (Feed) valve
23 Air delivery means
24 Pipeline system
26 Air-conditioning system
28 Heat source
30 Air heating device
32 Outflow valve

The invention claimed is:

1. A de-icing system for an aircraft comprising:
    at least one heat source generating heat;
    at least one air heating device comprising a heat exchanger configured to transfer the heat generated by the at least one heat source to heat air from a cabin of the aircraft; and
    at least one air delivery means for delivering heated cabin air into regions of the aircraft to be de-iced;
    wherein the at least one air delivery means is directly connected to a pipeline system, the pipeline system receiving the air from the cabin of the aircraft via the at least one air heating device.

2. The de-icing system of claim 1, wherein the at least one heat source is a fuel cell installed in the aircraft.

3. The de-icing system of claim 1, wherein the at least one heat source is an electronic device installed in the aircraft.

4. The de-icing system of claim 3, wherein the electronic device is a processing unit.

5. The de-icing system of claim 1, wherein the at least one heat source is a combination of a plurality of different or identical heat sources.

6. The de-icing system of claim 1, further comprising an air outflow valve for discharging waste air from the cabin of the aircraft, the air outflow valve being positioned on an end of at least one wing of the aircraft.

7. The de-icing system of claim 1, further comprising the at least one air delivery means configured to discharge air on the upper side of the wing of the aircraft to increase the lift, to reduce the aerodynamic resistance, or both.

8. A method for de-icing an aircraft, the aircraft comprising at least one air delivery means for delivering air into regions of the aircraft to be de-iced, wherein the at least one air delivery means is connected to a pipeline system, the method comprising:
    discharging air from the cabin of the aircraft through the pipeline system via an air heating device comprising a heat exchanger, wherein the air heating device is configured to transfer heat generated by at least one heat source to heat the air from the cabin, and
    heating in the air heating device the air from the cabin of the aircraft by transferring heat from at least one heat source.

9. An aircraft with a de-icing system comprising:
    at least one heat source generating heat,
    at least one air heating device comprising a heat exchanger configured to transfer the heat generated by the at least one heat source to heat air from a cabin of the aircraft; and
    at least one air delivery means for delivering heated cabin air into regions of the aircraft to be de-iced;
    wherein the at least one air delivery means is directly connected to a pipeline system, the pipeline system adapted for receiving the air from the cabin of the aircraft via the at least one air heating device.

* * * * *